US007333632B2

(12) United States Patent
Lewiner et al.

(10) Patent No.: US 7,333,632 B2
(45) Date of Patent: Feb. 19, 2008

(54) IMAGE AUTHENTICATING METHODS

(75) Inventors: Jacques Lewiner, Saint-Cloud (FR); Sylvain Javelot, Paris (FR); Damien Lebrun, Houilles (FR); Stephane Debusne, Montrouge (FR); Jean Philippe Francois, Paris (FR)

(73) Assignee: Cynove Sarl, Paris (FR)

( * ) Notice: Subject to any disclaimer, the term of this patent is extended or adjusted under 35 U.S.C. 154(b) by 428 days.

(21) Appl. No.: 10/536,315

(22) PCT Filed: Nov. 24, 2003

(86) PCT No.: PCT/FR03/03462

§ 371 (c)(1),
(2), (4) Date: May 26, 2005

(87) PCT Pub. No.: WO2004/051596

PCT Pub. Date: Jun. 17, 2004

(65) Prior Publication Data

US 2006/0072789 A1 Apr. 6, 2006

(30) Foreign Application Priority Data

Nov. 26, 2002 (FR) .................................. 02 14794

(51) Int. Cl.
*G06K 9/00* (2006.01)

(52) U.S. Cl. ...................... 382/104; 342/104; 342/118; 340/936; 340/933; 340/937; 701/117; 701/119; 380/30; 713/176

(58) Field of Classification Search ................ 382/104; 713/176; 340/936, 933, 937; 701/117, 119; 342/118, 104; 380/30
See application file for complete search history.

(56) References Cited

U.S. PATENT DOCUMENTS

| | | | | |
|---|---|---|---|---|
| 4,988,994 | A * | 1/1991 | Loeven | 340/936 |
| 5,912,822 | A * | 6/1999 | Davis et al. | 702/143 |
| 5,948,038 | A * | 9/1999 | Daly et al. | 701/117 |
| 6,269,446 | B1 * | 7/2001 | Schumacher et al. | 713/176 |
| 6,970,102 | B2 * | 11/2005 | Ciolli | 340/933 |
| 7,042,345 | B2 * | 5/2006 | Ellis | 340/436 |
| 7,093,131 | B1 * | 8/2006 | Kobayashi | 713/176 |
| 7,190,306 | B2 * | 3/2007 | Janssen | 342/118 |
| 2006/0066472 | A1 * | 3/2006 | Janssen | 342/104 |

FOREIGN PATENT DOCUMENTS

| | | | |
|---|---|---|---|
| EP | 0 621 572 | | 10/1994 |
| NL | EP621572 | * | 10/1994 |
| NL | EP0800088 | * | 3/1997 |
| WO | WO 02/082400 | | 10/2002 |

* cited by examiner

*Primary Examiner*—Samir Ahmed
*Assistant Examiner*—Nancy Bitar
(74) *Attorney, Agent, or Firm*—Young & Thompson

(57) ABSTRACT

To authenticate images taken by image capturing elements (3) of offending vehicles, for example, when exceeding the authorized speed, provided elements are provided for allowing informative data on the offence to be supplied, such as the speed of the vehicle, the date, the time and the place of the offence and various processing methods are provided which enable, during exploitation of the images, detection of whether or not manipulations have been carried out on the images.

20 Claims, 3 Drawing Sheets

IMAGE AUTHENTICATING METHODS

BACKGROUND OF THE INVENTION

1. Field of Invention

The present invention relates to a method allowing the authentication of images and in particular the authentication of images of vehicles caught committing an offence, such offences may be for example related to exceeding authorised speed limits, jumping red lights or the passage of a unauthorised vehicle in a lane reserved for public transport vehicles.

2. Description of Related Art

In fact, up until now, two methods of control have been used, methods requiring human intervention during detection of the offence or semi-automatic methods with capture of the image of the offending vehicles.

In the first case, the speed controls require the physical intervention of the police who in general and firstly note the offence.

The police statement resulting from this detection is then used for punishment of the offence and if necessary to implement ways to make the offending driver pay the corresponding fines.

However, such a series of operations requires human intervention at each stage of the process.

The probability of a speed control therefore remains relatively low and the weight of the subsequent processing of statements leads to a quite low rate of collection of payment of fines.

Consequently, this gives some motorists the feeling of impunity, which is detrimental in terms of security.

The same problem arises for offences of different types, for example, jumping a red light or driving in a reserved lane.

In the second case, the set-up of automatic procedures from the detection of the offence up to the recovery of the amount claimed as fines seems to greatly improve security and respect of the highway code.

Several approaches have been proposed in the past to attempt to automate such procedures.

For example, U.S. Pat. No. 5,381,155 proposes using a Doppler effect radar, firstly to measure the speed of vehicles and therefore to be able to detect is they are offending, then to trigger a camera to capture images of the offending vehicle or vehicles.

These images are then transmitted to a calculating unit to enable recognition and identification of the licence plates of the vehicles in question, then the images can be stored in non volatile memories.

When the said licence plates have been identified, it is then possible to transmit the registration numbers of the offending vehicles by telecommunication systems reserved for the police and thereby allowing intervention of the latter.

The presence of representatives of the police is therefore necessary for the noting of the offence.

Where an offence is contested by the driver or drivers concerned, the recorded images at the moment of the offence can be extracted from the memory in which they have been stored and can be used.

However, such an approach comes up against a major obstacle.

It is indeed easy, for example by using image touching up software, to modify the images stored and to replace, for example, the numbers of the license plates with other numbers.

Once such a manipulation can be easily implemented, the legal value of the transmitted images is greatly reduced. In an attempt to avoid this disadvantage, U.S. Pat. No. 5,563,590 proposed inserting, in the image taken at the moment of the offence, information relating to the speed of the vehicle, the hour and time of the offence, etc., in the form of alphanumerical characters.

From the alphanumerical information gathered in this way, new alphanumerical control characters are constructed which are also inserted in the image.

The photographs corresponding to the offending vehicles contain both the above characteristic information and the control alphanumerical characters.

Subsequently, when these documents are contested, it is possible to verify that the control alphanumerical characters are really those which correspond to the characteristic information taken at the time of the offence.

However, the device described in this patent presents significant disadvantages of different natures.

In particular, it uses silver photography techniques which require chemical process of films.

This leads to a need for regular and costly human intervention, for example to load the film rolls in the cameras and to replace them when they have been used.

The simple use of digital storage mediums instead of silver mediums does not resolve any of these problems.

Indeed, the alphanumerical characters used to characterise the images and assure control of the images appear in this case directly identifiable on the images and it is relatively easy to modify them, for example, with the aid of the previous touching up graphics software.

Furthermore, this information hides a part of the image which may lead to contentions in some cases.

In another improvement, U.S. Pat. No. 6,269,446, proposes calculating a digital signature from the images, this signature being placed in a hidden and non standardised way, in the header of the image files.

These solution presents however at least three serious disadvantages:

- firstly, certain formats of image files do not have a header, in particular, most of the image representative files recorded without image compression type processing, i.e. those with the best definition,
- secondly, with the signature in question being masked it can be contested by offending motorists because it is not an integral part of the elements of the judicial file for the offence,
- finally, because of the non standardised character of these operations, this signature may be deleted irreversibly during simple operations for saving the files.

SUMMARY OF THE INVENTION

The present invention has in particular the object of proposing an image authentication process and particularly of images of offending vehicles and accordingly, a method according to the invention comprises the following steps:

- allocating image capturing systems, arranged to allow the taking of images and the capture of identification elements of offenders, means of taking pictures supplying the data representative of the images taken, hereafter called captured image data,
- providing means, hereafter called informative systems, triggered by the capture of physical information relative to the offence, measure of the speed, time, date, location, etc. hereafter called offence data providing first memory and/or transmission means for memorising and/or transmitting the captured image data and the offence data providing operating systems for exploiting the memorised and/or transmitted data and is essentially characterised in that:

the operating systems apply to the captured image data, any known processing suitable for improving or conserving the quality of the images in question and/or to reduce the amount of data necessary for reconstruction of the images, without any significant loss of quality, in order to reduce the size of the memories necessary for storing the captured image data and/or the capacity of the means transmitting this data, the intermediate data representative of images after the processings being called initial graphical data, the operating systems calculating from the offence data and from a graphical representation of the alphanumerical characters associated with this offence data, new data representative of images, called graphical offence data, the operating systems merging the initial graphical data and the graphical offence data in such a way as to obtain a new set of data representative of images, called graphical identifier data, in which the initial graphical data and the graphical offence data constitute sub-sets accessible from this new set of data, the operating systems calculating, by applying a non-bijective function, denoted f, to the graphical identifier data, a set of data, hereafter called summary data, such that knowledge of only the summary data, does not allow one to return to the graphical identifier data, the operating systems applying to the summary data, a coding process denoted c, having an associated decoding process denoted $c^{-1}$, for obtaining a new set of data called signature data, the operating systems calculating, from the signature data and from a graphical representation of the alphanumerical characters associated with the signature data, new data representative of images, called graphical signature data, the operating systems merging the graphical identifier data and the graphical signature data so as to obtain a new set of data representative of images, in which the graphical identifier data and the graphical signature data constitute sub-sets accessible from this new set of data, called graphical authenticable data, providing second means of memorisation and/or of transmission of graphical authenticable data, providing control units which can respectively read and/or receive the graphical authenticable data stored in the second memory and/or transmission means, the data actually read and/or received being called graphical received data, the control units searching among the graphical received data for the subset of graphical identifier data, hereafter called tested graphical identifier data, the control units searching among the received graphical data, for the subset of graphical signature data, hereafter called tested graphical signature data, the control units looking for a data set representative of signature data, called tested signature data, from the tested graphical signature data and from a alphanumerical character recognition table, the control units calculating a set of data, called tested summary data by applying the non-bijective function f to the tested graphical identifier data, the control units applying to the tested signature data, the method of decoding $c^{-1}$ to obtain a set of data, called received summary data, and the control units compare the received summary data and the tested summary data, and supply an alert signal when the data is not identical and/or a confirmation signal when they are identical, In preferred embodiments of the method according to the invention, one has recourse to one and/or another of the following arrangements:

the informative systems include means to measure the speed of vehicles, the informative systems include means of detecting the presence of a non-authorised vehicle in a reserved lane, the informative systems include means of detecting a vehicle jumping a red light, the image capturing systems provide digital images, the methods of coding and/or decoding use cryptographic techniques, the methods of coding incorporate in the signature data, a sub-set of data, the subset being accessible and containing a set of alphanumerical characters sufficient for representing the signature data, the operating systems applying to the image data taken, successively a method of compression and an associated method of decompression, and memorising and/or transferring the data obtained towards the memory and/or transmission means, the first memory and/or transmission means of memorisation and the second memory and/or transmission means are united, the character recognition table is developed by applying a character recognition program code, the character recognition table is developed from tested graphical signature data.

Other features and advantages of the invention will appear from the following detailed description of one of the embodiments, given by way of a non-limiting example with reference to the accompanying drawings.

BRIEF DESCRIPTION OF THE DRAWINGS

In the drawings.

of the operating systems (4) calculates from the summary data (31) and by action of an appropriate program code (41) placed in a non-volatile memory means, the signature data (33)

DETAILED DESCRIPTION OF PREFERRED EMBODIMENTS

Figure 1:
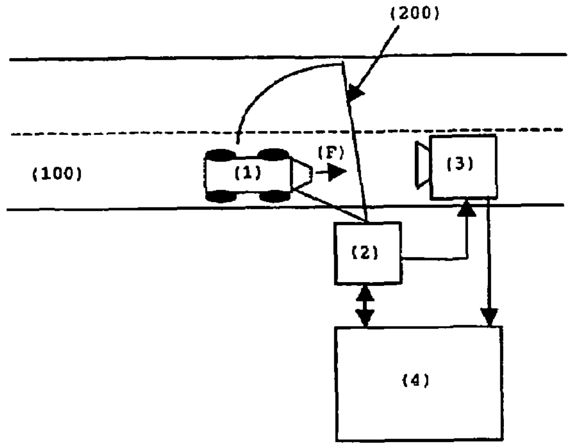
FIG. 1 is a schematic view of a method according to the prior art where a vehicle (1) moving on the road (100) in the direction indicated by the arrow (F), is intercepted by the radar beam (200) of an informative system including in particular a speedometer (2) linked to operating systems (4), and to image capturing systems (3)

When the speed of a vehicle (1), including an identification element (101), such as a licence plate, exceeds the authorised speed limit, a device according to the prior art including a speedometer (2) and an image capturing system (3) is arranged to take images of the offending vehicle in such a way as to enable its identification.

The speedometer may be for example made up of a Doppler effect radar, of a magnetic tape buried under the road or of a laser system.

Means are provided for providing associated physical information, such as the time and the date of the offence, the position of the device, etc.

First means are provided for recording and/or transmitting the data representative of the images taken by the image capturing systems, hereafter designated captured image data (30) and the data representative of the physical information, hereafter called offence data (20), preferably in the form of digital data.

Figure 6:
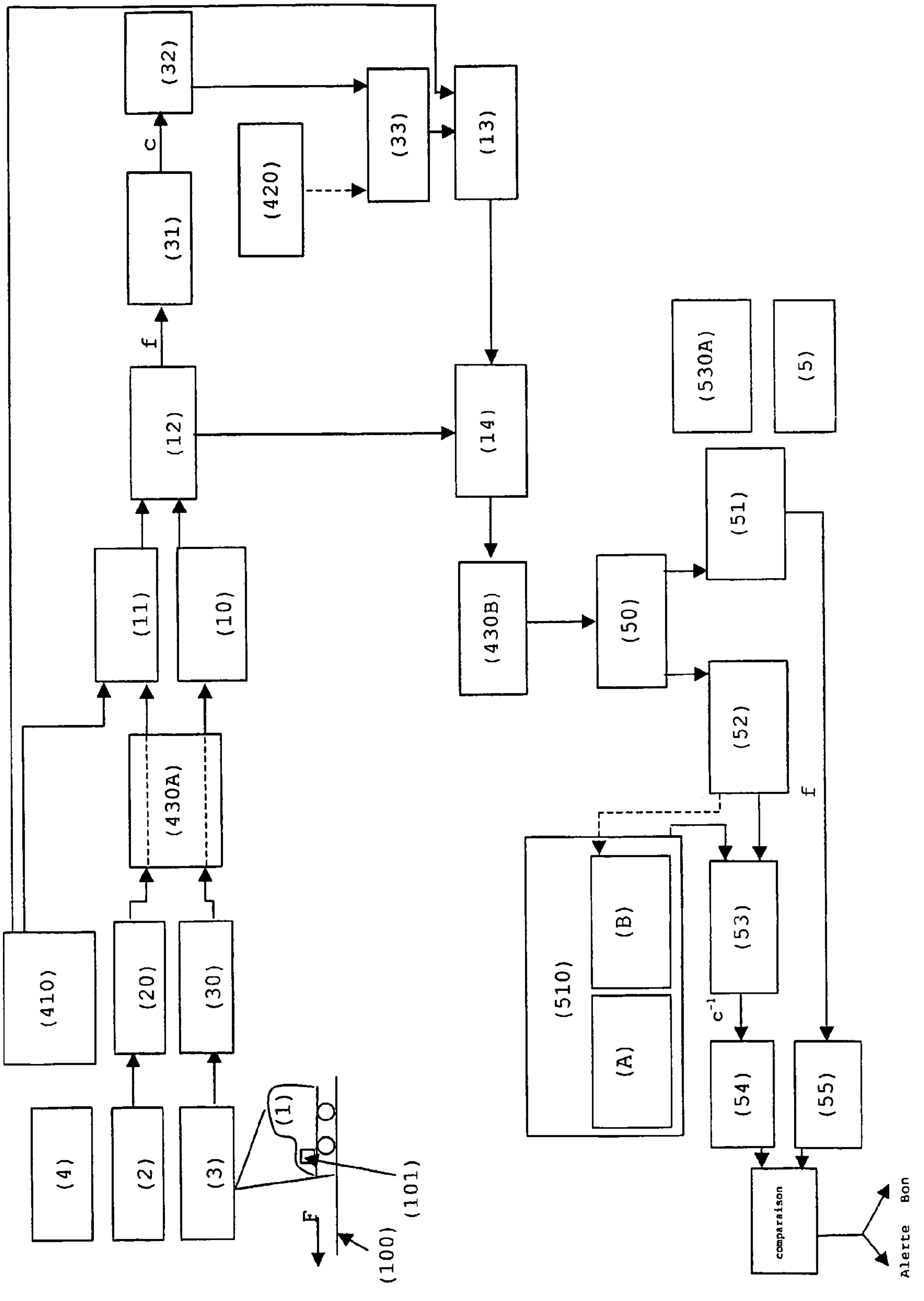
FIG. 6 is a schematic view representing an example of a series of steps of the process according to the invention, the operating systems and the control units, here placed outside so as not to overload the figure, being connected by any known means to the different elements.

In the example of FIG. 6, memory and/or transmission means have been placed at three points of the diagram, but it will be apparent that such means can be disposed at any other point of the diagram, at positions naturally determined in ways known by skilled men in the art.

The memory means may also be made in any known way, by using for example semiconductor memories, magnetic memories etc.

The data transmission means may be of different types, transmission by cable, by communication bus or by the radio.

The operating systems (4) are provided for operating on this data.

In order, in particular, to reduce the transmission times of the offence data and the captured image data and/to carry out the different processes implemented in the method, it is advantageous to equip the operating systems with one or more processors (400) and first volatile and non volatile memory and/or transmission means (430A).

In the particular embodiment examples, the processors can be integrated in semiconductor FPGA type components or specialised ASIC type semiconductor components.

The contents of these first memory means can of course be read and written by the processors of these operating systems.

It is possible to apply to the captured data, well known data compression methods enabling the size of memory used for storing the data or the capacity of the transmission means of the data to be reduced.

Among the methods of data compression, it is possible to use methods known as without information loss or methods known as entropy, with information loss, applied in particular to the data representative of images and obtaining in this way compressed data.

A compression factor allowing identification of offending vehicles without any ambiguity during the display of the images, is chosen.

The choice of compression factor can be made, for example, during installation of the image capturing systems, the operating systems recording in the memory means, data representative of images taken for different compression factors, and transmitting the contents of these memory means to the control units (5), used only during the installation phase.

The control units use display means in order to verify the quality of the images reconstructed from the compressed data.

Similarly, when necessary, for example in the case of bad lighting or bad weather conditions, the operating systems can apply any known processing method to the image data taken in order to facilitate the identification of the offending vehicles.

For example it is possible to intensify the contrast of the images and to recognise the alphanumerical characters registered on the licence plate.

After the possible application of these processes, new data representative of the offending vehicles called initial graphical data (10) is obtained which can be memorised or transmitted.

Any know method of memorisation can be used, and in particular non-volatile methods.

Non-volatile memory means are used to store the graphical representation of the alphanumerical characters output from the informative systems, this memory means being called a non volatile font memory.

In a first embodiment, the non-volatile font memory contains the graphical representation of the alphanumerical character in the form of point matrixes.

In a second embodiment, the non-volatile font memory contains the graphical representation of the alphanumerical character in the form of bar codes.

New data representative of images displaying the offence data, is determined from the offence data and from the graphical representation of the alphanumerical characters, these images being for example:

123 km/h=01/01/02

Figure 2:
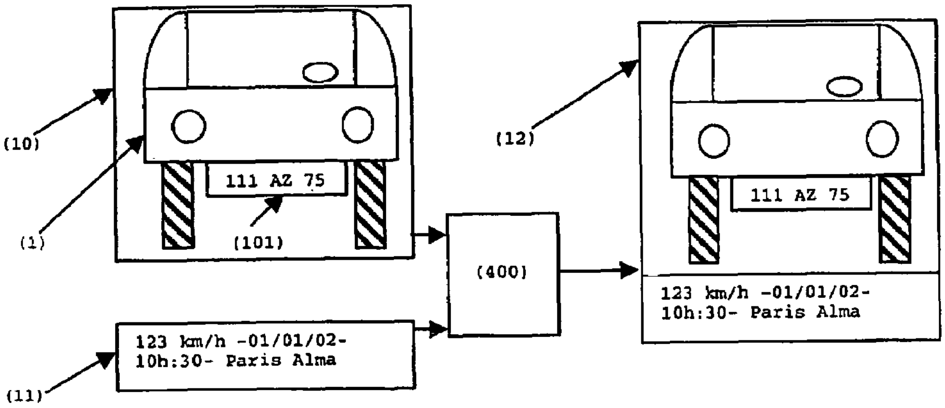
FIG. 2 is a schematic view of a step of the method according to the invention where a processor (400) of the operating systems merges the initial graphical data (10), of a vehicle (1), taken from the front and including identification elements (101) and graphical offence data (11), for obtaining the graphical identifier data (12)
Figure 3:
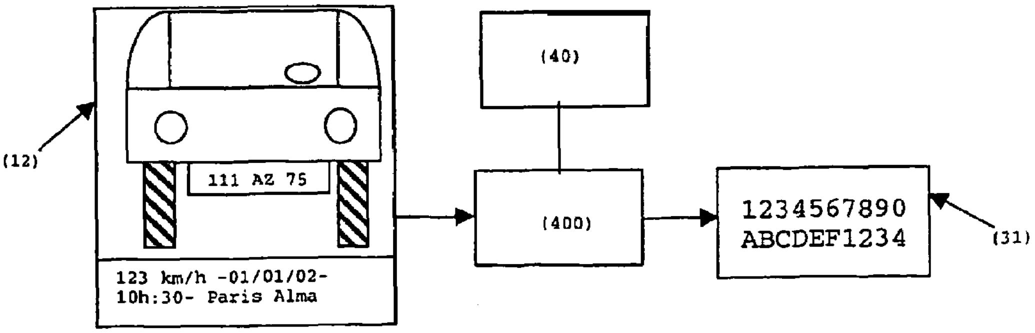
FIG. 3 is a schematic view of an intermediate step of the method according to the invention where a processor (400) of the operating systems calculates from the graphical identifier data (12) and by action of an appropriate program code (40) placed in a non-volatile memory means, the summary data (31)
Figure 4:
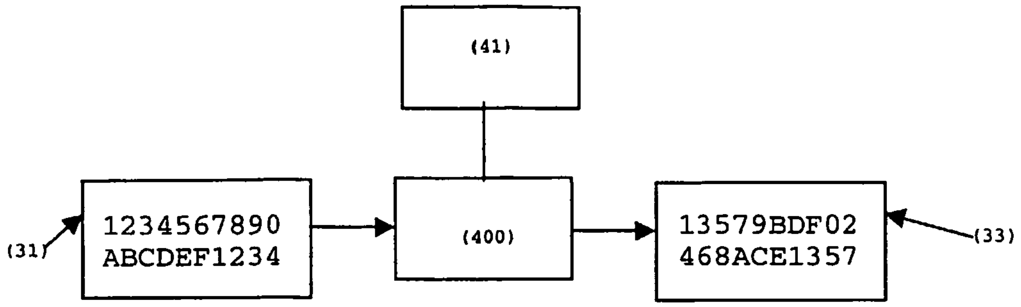
FIG. 4 is a schematic view of an intermediate step of the method according to the invention where a processor (400)

10 h:30 Paris Alma as illustrated in FIG. 2, this data being subsequently called, graphical offence data.

In the particular case where data compression has not been applied to the captured image data and where one wishes to be able to simultaneously display the image of the offending vehicle and the images displaying the offence data, a new set of data, called graphical identifier data (12) is developed through the following steps:

- determining the relative sizes of the images of the data representative of the images incorporating the initial graphical data and the graphical offence data, this operation having being done during installation of the system,
- and recording in a memory the initial graphical data and the graphical offence data In FIG. 6, the dotted lines in the memory and/or transmission means (430A) are a symbolic representation of the fact that the graphical offence data comes from the offence data (20) and that the initial graphical data comes from the captured images (30).

In this way, the graphical offence data and the initial graphical data constitute two sub-sets accessible from the graphical identifier data.

In the particular example represented in FIG. 2, the images representing the offence data are placed under the images taken by the image capture systems.

It is apparent, that the images representing the offence data could in an equivalent way be, for example, placed above images taken by the image capturing systems, or on the sides or any other place.

It should be noted that when one of the data compression methods has been used, the merging of the graphical identifier data and the graphical offence data is also possible.

In this case, it is for example possible to apply in an intermediary step, the method of decompression associated with the two data sets, which allows it to be reduced to the previous case, then applying once again the method of compression to obtain the graphical identifier data.

A program code (40) necessary for applying to a selected set of data, a non bijective calculation method known in the prior art and hereafter called function f, is memorised in a non volatile memory.

For example, it is possible to use the calculation method described in the standardisation document FIPS PUB 180-1, published by the National Technical Information Service, U.S. Department of Commerce, Springfield Calif. 22161.

The implementation of this method on the graphical identifier data leads to a new set of data, hereafter called summary data (31).

In the above case, the summary data is then sets of 160 bits of information.

It should be noted, that with images with a definition permitting the identification of offending vehicles, i.e. including several tens of thousands of image elements, it is evidently impossible, from the summary data of 160 bits, to reconstruct the graphical identifier data by using an inverse calculation method.

A method of coding known as public key/private key, such as is described for example in U.S. Pat. No. 4,405,829 is then applied to the summary data, which leads to new data, hereafter designated coded summary data.

There again, the program code (41) necessary for the application of the coding method in question is memorised in a non volatile memory.

The abovementioned private key is known only to skilled personnel.

The private key can be permanently memorised in the operating systems or preferably in volatile memories, allowing the security of the method to be improved.

In the latter case, the key can be downloaded from a highly secure database.

Accordingly, in case of theft of a device implementing the process, the private key remains inaccessible, even if the elements constituting the device are analysed.

In a particular embodiment, the operating systems merge the coded summary data with another set of data, called alphabet data (420), for example by placing after the coded summary data the set of alphanumerical characters sufficient for representing the coded summary data.

For example, when the coded summary data is represented in a hexadecimal base, the operating systems place after the coded summary data, alphanumerical characters 0 to 9 and A to F which constitute in this case the alphabet data.

It should be noted that in the particular example of implementation given above, the alphabet data is placed after the coded summary data, but that this alphabet data could be also be placed before the coded summary data or in any other way allowing the whole of the subset of alphabet data to be reconstituted.

The coded summary data, which may merge with the alphabet data, is called signature data (33).

Figure 5:
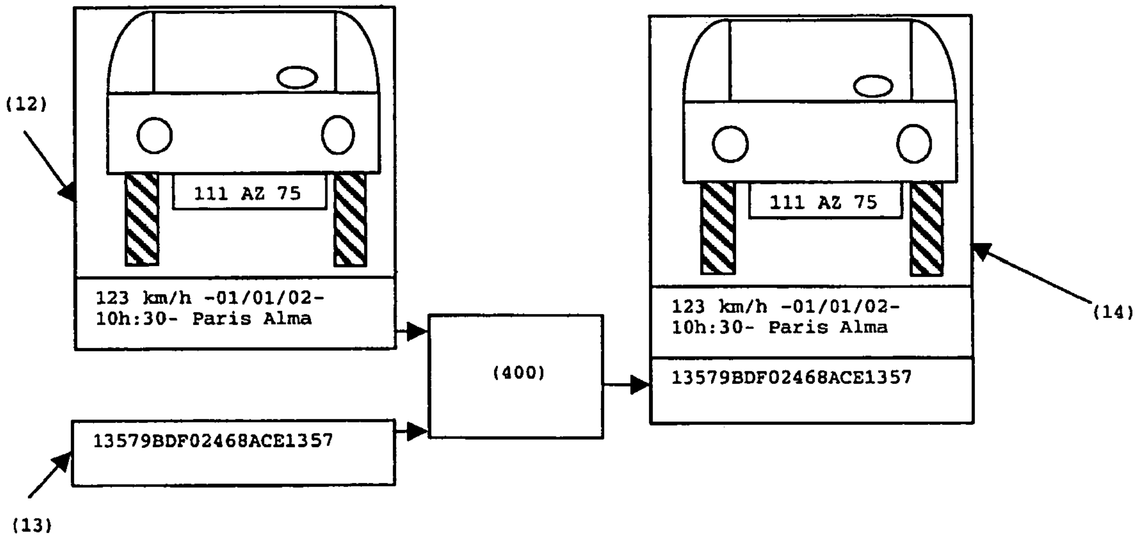
FIG. 5 is a schematic view of an intermediate step of a method according to the invention where a processor (400) of the operating systems (4) merges the graphical identifier data (12) and the graphical signature data (13), to constitute graphical authenticable data (14)

It should also be noted that merging the alphabet data with the coded summary data does not change the decoding method c−1, since the coded summary data still forms an accessible sub-set of the signature data From the signature data and from the graphical representation of the alphanumerical characters new data representative of images displaying the signature data is determined, these images being for example:

13579BDF02468ACE1357 as illustrated in FIG. 5, the new data subsequently being called graphical signature data (13).

The graphical representations in question can be formed of point matrixes or bar codes for example.

The graphical identifier data (12) is merged with the graphical signature data (13), for example, according to the method already used for merging the graphical offence data (11) with the initial graphical data (10) and in this way the authenticable graphical data is obtained (14).

In the particular example of FIG. 5, the images representing the signature data are placed under the images representing the graphical identifier data.

It will be apparent, that the images representing the signature data could also be placed above the images representing the graphical identifier data, or on the sides or at any other place.

Furthermore the operating systems are also equipped with second memory and/or transmission means (430B) in order to enable the diffusion of the graphical authenticable data.

In a first embodiment, the operating systems include removable non volatile memory means, for example in the form of a memory card which can be removed from the system by an operator and placed in a control unit (5).

Such a control unit may be made be made up of a portable computer or a much smaller box capable of reading the contents of the card when it is associated with it.

In this first embodiment, the removable non volatile memory means can also be used as first memory means.

In a second embodiment, the operating systems include telecommunication means, for example, linked to a telephone line, allowing the transmission of authenticable graphical data towards a control unit.

Such a unit may be made up of a computer equipped with a modem connected to a telephone line.

In this second embodiment, the transmission means can also be used as first transmission means for telecommunication with the image capture systems.

In a third embodiment, the operating systems include wireless telecommunication means and are arranged to transmit the authenticable graphical data to a control unit.

The control unit may be constituted of a computer comprising a radio modem.

In the third embodiment, the first transmission means can be of the same kind as those above.

The data actually read and/or received by the control units is called received graphical data.

The control units include one or several processors.

The control units can record in third memory means (530A), like hard disks for example, the received graphical data in the form of computer files.

These memory means can be also used for storing all the algorithms and data necessary for looking for the size and position of the graphical identifier data and the graphical signature data.

The set of received graphical data is therefore separated into two sub-sets of data called tested graphical identifier data (51) and tested graphical signature data (52), the two sub-sets being associated with sub-sets of graphical identifier data and graphical signature data, respectively, of the set of data memorised and/or transmitted by the operating systems.

In a first embodiment, the control units include in the non-volatile memory means, a program code (510A) for recognising the characters which convert the tested graphical signature data into alphanumeric characters to form a new set of data called signature data.

In a second embodiment and when the coded summary data has been merged as described above with the alphabet data (420), to form signature data, the following steps are carried out at the control units:

looking for tested graphical signature data in the received graphical data, looking for graphical representations of the alphabet data in the graphical signature data, called tested graphical alphabet data (510B), calculating the tested signature data (53) by comparing the tested graphical signature data with the tested graphical alphabet data.

The memory means can also contain the non-bijective calculation operating program code used above, defined by the function f, as well as the operating program code of the decoding program $c^{-1}$, known through the public key associated with the private key which was used to code the summary data.

The function f is applied to the tested graphical identifier data (51) leading to new data called tested summary data (55) and the decoding program $c^{-1}$ is applied to the tested signature data leading to new data called received summary data (54), respectively.

The tested summary data and the received summary data are compared.

When the two sets of data are identical, the images are considered as being authenticated.

An alphanumeric message of validation directly readable by a human operator can be displayed on the screen.

On the contrary, when two sets of data are not identical, a signal visually readable on the screen or by any other method indicating that manipulation of the image has been detected, can be provided.

By using the method which has just been described, it is therefore possible to verify if there has been any falsification of an image, for example by giving an offending vehicle the identification characteristics of another vehicle.

The resulting image authentication thereby solves the unsolved problems mentioned above.

As is evident, and is apparent from the foregoing, the invention is not limited to the example of the particular embodiment which has just been described, on the contrary it includes all variants in particular those in which the method is implemented when the offence is other than that which is associated with exceeding authorised speed by a vehicle and for example, when it relates to the detection of a person in a protected access zone for which the person has no authorisation.

What is claimed is:

1. A method of authenticating images and particularly images of offending vehicles comprising the following steps:

allocating image capturing systems (3), arranged to allow the taking of images and the capture of identification elements (101) of offenders (100), means of taking pictures supplying the data representative of the images taken, hereafter called captured image data (30);

providing informative system means to capture physical information relative to the offence, hereafter called offence data (20);

providing first memory and/or transmission means (430A) for memorizing and/or transmitting the captured image data and the offence data providing operating systems (430A) for exploiting the memorized and/or transmitted data and being essentially characterized in that:

the operating systems apply to the captured image data, any known processing suitable for improving or conserving the quality of the images in question and/or reducing the amount of data necessary for reconstruction of the images, without any significant loss of quality, in order to reduce the size of the memories necessary for storing the captured image data and/or the capacity of the means for transmitting this data, the intermediate data representative of images after these processing being called initial graphical data (10);

the operating systems operated to calculate from the offence data and from a graphical representation of the alphanumerical characters (410) associated with the offence data, new data representative of images, called graphical offence data (11);

the operating systems merging the initial graphical data and the graphical offence data in such a way as to obtain a new set of data representative of images, called graphical identifier-data (12), in which the initial graphical data and the graphical offence data constitute sub-sets accessible from this new set of data;

the operating systems operated to calculate, by applying a non-bijective function, denoted f, to the graphical identifier data, a set of data, hereafter called summary data (31), such that knowledge of only the summary data, does not allow one to return to the graphical identifier data; the operating systems applying to the summary data a coding process denoted c, having an associated decoding process denoted c.sup.−1, for obtaining a new set of data called signature data (33);

the operating systems operated to calculate, from the signature data and from a graphical representation of the alphanumerical characters constituting the signature data, new data representative of images, called graphical signature data (13);

the operating systems merging the graphical identifier data and the graphical signature data so as to obtain a new set of data representative of images, in which the graphical identifier data and the graphical signature data constitute sub-sets accessible from this new set of data, called graphical authenticable data (14), providing second means of memorization and/or of transmission (430B) of graphical authenticable data, providing control units (5) which can respectively read and/or receive the graphical authenticable data stored in the second memory and/or transmission means, the data actually read and/or received being called graphical received data (50);

the control units searching among the graphical received data for the subset of graphical identifier data, hereafter called tested graphical identifier data (51), the control units searching among the received graphical data, for the subset of graphical signature data, hereafter called tested graphical signature data (52); the control units looking for a data set representative of signature data, called tested signature data (53), from the tested graphical signature data and from a alphanumerical character recognition table (510);

the control units operated to calculate a set of data, called tested summary data (55), by applying the non-bijective function to the tested graphical identifier data;

the control units applying to the tested signature data, the method of decoding c.sup.−1 to obtain a set of data, called received summary data (54); and the control units comparing the received summary data and the tested summary data, and supplying an alert signal when the data is not identical and/or a confirmation signal when they are identical.

2. The method of claim 1, wherein the informative systems include means to measure the speed of vehicles.

3. The method of claim 1, wherein the informative systems include means of detecting the presence of a non-authorised vehicle in a reserved lane.

4. The method of claim 1, wherein the informative systems include means of detecting a vehicle jumping a red light.

5. The method of claim 1, wherein the image capturing systems provide digital images.

6. The method of claim 1, wherein the methods of coding and/or decoding use cryptographic techniques.

7. The method of claim 1, wherein the methods of coding incorporate in the signature data, an accessible sub-set of data, containing a set of alphanumerical characters sufficient for representing the signature data.

8. The method of claim 1, wherein the operating systems apply to the image data taken, successively a method of compression and an associated method of decompression, and memorising and/or transferring the data obtained towards the memory and/or transmission means.

9. The method of claim 1, wherein the first memory and/or transmission means and the second memory and/or transmission means are united.

10. The method of claim 1, wherein the character recognition table is developed by applying a character recognition program code.

11. The method of claim 1, wherein the character recognition table is developed from tested graphical signature data.

12. The method of claim 5, wherein the informative systems include means to measure the speed of vehicles.

13. The method of claim 5, wherein the informative systems include means of detecting the presence of a non-authorised vehicle in a reserved lane.

14. The method of claim 5, wherein the informative systems include means of detecting a vehicle jumping a red light.

15. The method of claim 5, wherein the methods of coding and/or decoding use cryptographic techniques.

16. The method of claim 5, wherein the methods of coding incorporate in the signature data, an accessible sub-set of data, containing a set of alphanumerical characters sufficient for representing the signature data.

17. The method of claim 5, wherein the operating systems apply to the image data taken, successively a method of compression and an associated method of decompression, and memorising and/or transferring the data obtained towards the memory and/or transmission means.

18. The method of claim 5, wherein the first memory and/or transmission means and the second memory and/or transmission means are united.

19. The method of claim 5, wherein the character recognition table is developed by applying a character recognition program code.

20. The method of claim 5, wherein the character recognition table is developed from tested graphical signature data.

* * * * *